US008682054B2

United States Patent
Xue et al.

(10) Patent No.: US 8,682,054 B2
(45) Date of Patent: Mar. 25, 2014

(54) METHOD AND SYSTEM FOR PROPAGATION OF MYOCARDIAL INFARCTION FROM DELAYED ENHANCED CARDIAC IMAGING TO CINE MAGNETIC RESONANCE IMAGING USING HYBRID IMAGE REGISTRATION

(75) Inventors: Hui Xue, Franklin Park, NJ (US); Yixun Liu, Bethesda, MD (US); Christoph Guetter, Lawrenceville, NJ (US); Marie-Pierre Jolly, Hillsborough, NJ (US); Jens Gühring, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 247 days.

(21) Appl. No.: 13/296,487

(22) Filed: Nov. 15, 2011

(65) Prior Publication Data
US 2012/0121154 A1 May 17, 2012

Related U.S. Application Data

(60) Provisional application No. 61/413,606, filed on Nov. 15, 2010.

(51) Int. Cl.
*G06K 9/00* (2006.01)
(52) U.S. Cl.
USPC .......................................................... 382/131
(58) Field of Classification Search
None
See application file for complete search history.

(56) References Cited

U.S. PATENT DOCUMENTS

| 6,205,349 B1 | 3/2001 | Kim et al. |
| 7,668,354 B2 | 2/2010 | O'Donnell et al. |
| 2009/0005673 A1 | 1/2009 | Rehwald et al. |
| 2009/0275822 A1 | 11/2009 | Detsky et al. |

OTHER PUBLICATIONS

Feng W, Nagaraj H, Gupta H, Lloyd GS, Aban I, Perry JG, Calhoun AD, Dell'Italia JL, Denney ST Jr: A dual propagation contours technique for semi-automated assessment of systolic and diastolic cardiac function by CMR. J Cardiovasc Magn Reson 2009, 11:30.*
Zeng, Qingguo, and Yunmei Chen. "Accurate inverse consistent non-rigid image registration and its application on automatic re-contouring." Bioinformatics Research and applications. Springer Berlin Heidelberg, 2008. 293-304.*
Gu, Zhijun, and Binjie Qin. "Nonrigid registration of brain tumor resection mr images based on joint saliency map and keypoint clustering." Sensors (Basel, Switzerland) 9.12 (2009): 10270.*

(Continued)

*Primary Examiner* — Nirav G Patel
(74) *Attorney, Agent, or Firm* — Michele L. Conover

(57) ABSTRACT

A method and system for propagation of myocardial infarction from delayed enhanced magnetic resonance imaging (DE-MRI) to cine MRI is disclosed. A reference frame is selected in a cine MRI sequence. Deformation fields are calculated within the cine MRI sequence to register the frames of the cine MRI sequence to the reference frame. A DE-MRI image having an infarction region is registered to the reference frame of the cine MRI sequence. The DE-MRI image may be registered to the infarction region using a hybrid registration algorithm that unifies both intensity and feature points into a single cost function. Infarction information in the DE-MRI image is then propagated cardiac phases of the frames in the cine MRI sequence based on the registration of the DE-MRI image to the reference frame and the plurality of deformation fields calculated within the cine MRI sequence.

32 Claims, 6 Drawing Sheets

(56) References Cited

OTHER PUBLICATIONS

Lee, Myung-Eun, et al. "Medical image registration using the modified conditional entropy measure combining the spatial and intensity information." SPIE Medical Imaging. International Society for Optics and Photonics, 2010.*

* cited by examiner (a) BEFORE REGISTRATION    (b) AFTER REGISTRATION a    b    c d    e    f

METHOD AND SYSTEM FOR PROPAGATION OF MYOCARDIAL INFARCTION FROM DELAYED ENHANCED CARDIAC IMAGING TO CINE MAGNETIC RESONANCE IMAGING USING HYBRID IMAGE REGISTRATION

This application claims the benefit of U.S. Provisional Application No. 61/413,606, filed Nov. 15, 2010, the disclosure of which is herein incorporated by reference.

BACKGROUND OF THE INVENTION

The present invention relates to cardiac imaging, and more particularly, to propagation of myocardial infarction from delayed enhanced cardiac imaging to cine magnetic resonance imaging.

Cardiac magnetic resonance imaging (MRI) has been proven effective for determining patient-specific myocardial motion and functional information using cine imaging, as well as for detection of myocardial infarction using delayed enhanced MRI (DE-MRI). Recent studies have compared myocardial tissue viability revealed in the DE-MRI to the functional deficits measured with cine MRI, showing the so-called "peri-infarction zone" defined in DE-MRI is correlated well with the dysfunctional myocardial region defined in cine. This information is potentially valuable for reperfusion therapy, as regional motion of an infarction zone defined before the therapy is assessed to evaluate the recovery of myocardium.

Although the clinical value of joint DE-MRI and cine image assessment is exhibited, standard clinical cardiac MR protocols typically acquire two sets of images across multiple measurements with variant imaging plane prescription and multiple breath-holdings. Misalignment and local deformation often appear between cine and DE-MRI, even if the imaging plane remains unchanged for two acquisitions by careful prescription, mainly due to inconsistent cardiac phases used for acquiring cine and DE-MRI, imperfect cardiac gating and respiratory motion. It is more problematic for patients with arrhythmias, as unstable cardiac cycles make it unreliable to identify the matching cine frame acquired in the same cardiac cycle as the DE-MRI.

BRIEF SUMMARY OF THE INVENTION

Without an accurate mapping of the infarction zone to the cine images, regional myocardial changes in motion pattern caused by suspicious scars can only be visually assessed. Accordingly, accurate alignment and deformation correction between cine and DE-MRI can be advantageous for successful joint assessment, where one aim is to propagate the infarction delineated in a DE-MRI to all cine frames throughout the whole cardiac cycle and to enable quantitative regional motion pattern analysis of the infarction.

The present invention provides a method and system for propagation of a myocardial infarction from a DE-MRI image to cine MRI images. Embodiments of the present invention provide dedicated post-processing algorithms for aligning a DE-MRI image with a corresponding cine image and propagating a suspicious infarction zone from the DE-MRI image to all other cardiac phases. Infarction regions delineated in the DE-MRI image can be used to define a region of interest (ROI) for the quantification of regional abnormality of myocardial motion.

In one embodiment of the present invention, a reference frame is selected in a cine MRI sequence having a plurality of frames. A plurality of deformation fields are calculated within the cine MRI sequence to register other frames in the cine MRI sequence with the reference frame. A DE-MRI image is registered to the reference frame of the cine MRI sequence. Infarction information in the DE-MRI image is then propagated over all a plurality of cardiac phases corresponding to the frames of the cine MRI sequence based on a deformation field resulting from registering the DE-MRI image to the reference frame and the deformation fields calculated within the cine MRI sequence.

These and other advantages of the invention will be apparent to those of ordinary skill in the art by reference to the following detailed description and the accompanying drawings.

DETAILED DESCRIPTION

The present invention is directed to a method and system for propagation of myocardial infarction from delayed enhanced magnetic resonance imaging (DE-MRI) over a cardiac cycle using cine MRI. Embodiments of the present invention are described herein to give a visual understanding of the DE-MRI infarction propagation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention provide align a DE-MRI image with a corresponding cine image and propagating a suspicious infarction zone from the DE-MRI image to all other cardiac phases of a cardiac cycle. Infarction regions delineated in the DE-MRI image can be used to define a region of interest (ROI) for the quantification of regional abnormality of myocardial motion. Embodiments of the present invention align the DE-MRI image to a cine image using a hybrid registration algorithm that unifies both intensity and feature points into one cost function. An intensity term is used to match two images on a coarse level, playing a role of regularization and dominating the alignment of normal myocardium, while a feature point term is robust against contrast changes between DE-MRI and cine, as in the cine images, the infarction zone bears little contrast as compared to normal myocardium and is largely invisible. The propagation of the infarction zone throughout the cine can be achieved by estimating myocardial deformation in the cine series using a variational non-rigid registration algorithm with inverse consistent constraint.

Figure 1:
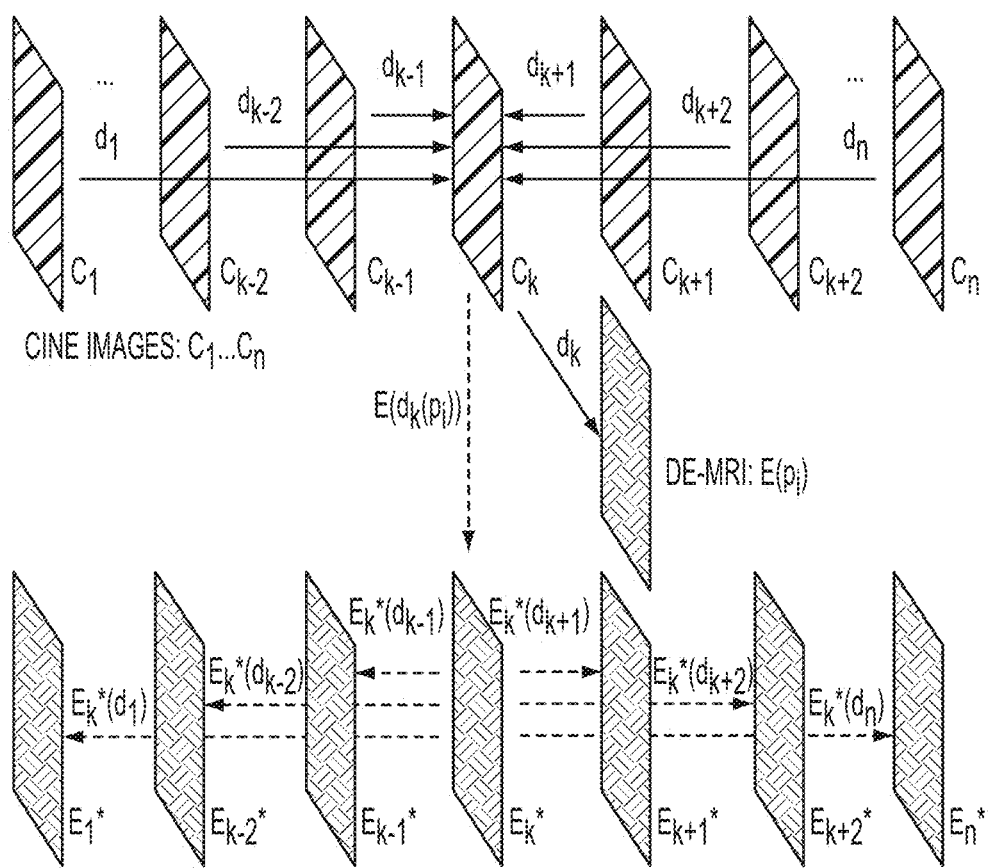
FIG. 1 illustrates alignment of DE-MRI image to a cine image and propagation of the DE-MRI image according to an embodiment of the present invention.

To align a DE-MRI image to a cine image and propagate suspicious infarction information, two types of deformation need to be estimated. The first corrects the mis-alignment between DE-MRI and cine and the second quantifies myocardial motion within the cine series. FIG. 1 illustrates alignment of DE-MRI image to a cine image and propagation of the DE-MRI image according to an embodiment of the present invention. As illustrated in FIG. 1, $c_l$, l=1 ... n denotes the cine images (frames); $c_k$ denotes the reference frame; $E(p_i)$ denotes the DE-MRI image; $d_k$ denotes the deformation from the reference frame $c_k$ to the DE-MRI image $E(p_i)$; $d_l$, l=1 ... n, l≠k denotes the deformation from $c_l$ to $c_k$; $p_i$ denotes the pixel with index i; and $E_l^*$, l=1 ... n denotes propagated DE-MRI images. The solid line arrows in FIG. 1 show the deformation direction and the dashed line arrows in FIG. 1 show the propagation direction.

As multiple cine images are required to cover an entire cardiac cycle, while DE-MRI image is usually acquired at a specific temporal phase, the cine image which is most similar to the DE-MRI image is selected as the reference frame $c_k$ to which the DE-MRI image is registered. Assuming that the k-th cardiac phase is the reference cine image $c_k$, the deformation $d_k$, from $c_k$ to the DE-MRI image $E(p_i)$ is determined by a hybrid image registration method, and both forward and inverse deformation fields $d_l$, l=1 ... n, l≠k are determined by a variational method. Once all of the deformation fields $d_l$, l=1 ... n are calculated, the DE-MRI and infarction region can be propagated.

Figure 2:
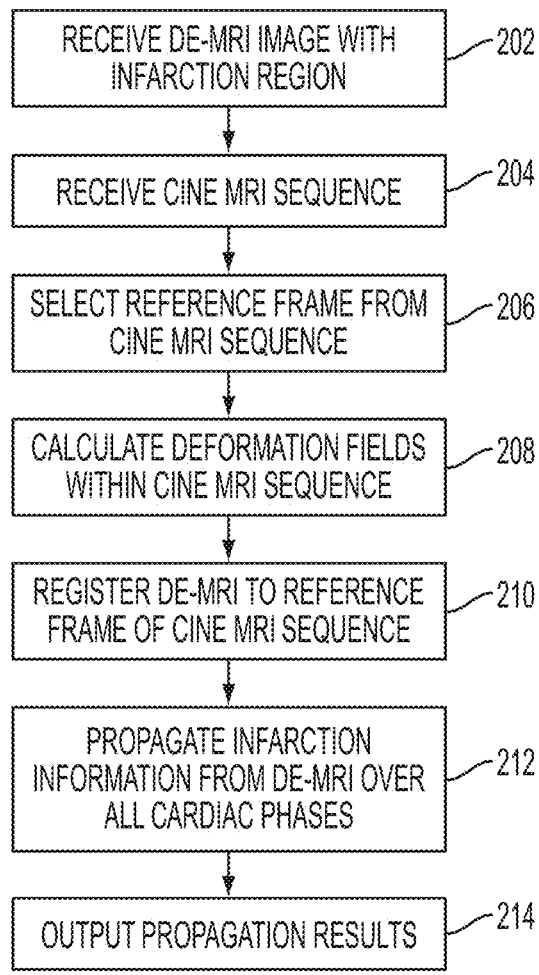
FIG. 2 illustrates a method for propagating myocardial infarction information from a DE-MRI over a cardiac cycle according to an embodiment of a present invention.

FIG. 2 illustrates a method for propagating myocardial infarction information from a DE-MRI over a cardiac cycle according to an embodiment of a present invention. As illustrated in FIG. 2, at step 202, a DE-MRI image having an infarction region is received. The DE-MRI image may be received directly from an MR scanner using a delayed-enhanced imaging technique. It is also possible that the DE-MRI image is received by loading a DE-MRI image previously stored in a storage or memory of a computer system. The infarction region may be delineated or segmented in the DE-MRI image. The infarction regions can be delineated manually or automatically using various segmentation methods. In one possible embodiment, a DE-MRI image having a delineated infarction region may be loaded from a memory or storage of a computer system. In another embodiment, the DE-MRI image is received and then segmented to delineate the infarction region.

At step 204, a cine MRI sequence is received. The DE-MRI image and the cine MRI sequence are of the same patient. The cine MRI sequence is a temporal sequence of multiple cardiac MRI images, each referred to as a "frame". The cine MRI sequence can be received directly from an MR scanner. It is also possible that the cine MRI sequence can be received by loading a cine MRI sequence previously stored on a memory or storage of a computer system.

At step 206, a reference frame is selected from the cine MRI sequence. According to an advantageous implementation, the cine frame that is most similar to the DE-MRI image is selected as the reference frame. If available, a trigger time associated with each cine image may image may be used to select the cine frame at the closest cardiac phase to match the DE-MRI image. For example, the trigger times associated with cine MRI sequence may be stored in a database with the cine MRI sequence. For a cine sequence where trigger time is not recorded, the cross-correlation (CC) is calculated between every cine frame and the DE-MRI image, and the cine frame with the largest CC value is selected as the reference frame.

At step 208, deformation fields within the cine MRI sequence are calculated to register the frames of the cine MRI sequence to the reference frame. In order to propagate the suspicious infarction in the DE-MRI image from the reference frame to all other cine frames, the deformation between each cine frame and the reference frame may be estimated using a fast variational non-rigid registration algorithm. This approach can be considered as an extension of a classic optical flow method. In this framework, a dense deformation field is estimated as the solution to a calculus of variation problem, which is solved by performing a compositional update step corresponding to a transport equation. The regularization is added by low-pass filtering the gradient images which are in turn used as velocity field to drive the transport equation. To speedup the convergence and avoid local minima, a multi-scale image pyramid may be created. The local cross correlation can be used as the image similarity measure, as its explicit derivative can be more efficiently calculated than mutual information and it is still general enough to cope with intensity fluctuation and imaging noise between two adjacent perfusion frames.

Registration of time series such as MR cine is typically performed by selecting a reference phase to which all other phases are registered. This approach is not sufficient to propagate the DE-MRI image and/or the infarction zone, which represented as a contoured region in the DE-MRI image, throughout the cardiac phases. Specifically, deformation fields pointing to the reference phase are required to warp the DE-MRI image while the inverse deformations pointing from reference phase to other frames are needed to warp the infarction contours. Accordingly the above-mentioned registration algorithm is extended to estimate inverse consistent deformation fields.

A deformation field $\Phi_{pq}$ is inverse consistent if $\Phi_{pq} \cdot \Phi_{pq}^{-1} = I$ and $\Phi_{pq}^{-1} = \Phi_{qp} \cdot \Phi_{pq}$ is calculated by minimizing the inverse consistent similarity metric:

$$J_{icCC} = J_{CC}(f_p, f_q, \Phi_{pq}) + J_{CC}(f_q, f_p, \Phi_{qp}) \qquad (1)$$

Here $J_{CC}$ is the local cross-correlation. $f_p$ and $f_q$ are two cine phases (frames). The deformation between $f_p$ and $f_q$ is $\Phi_{pq}$: $\Re^2 \to \Re^2$.

An efficient update scheme of iterative gradient descent can be used in order to minimize the inverse consistent similarity in a reasonable time. In particular, each deformation field is alternately updated during descending the gradient of the similarity measure resulting in an accurate computation of the inverse deformation and a quasi-symmetric registration algorithm. The achieved inverse consistency of the deformation fields not only allows for propagating both images and contours between any two cardiac phases, but may also leads to more accurate quasi-symmetric image registration.

At step 210, the DE-MRI image is registered to the reference cine frame. The variational deformable registration method described above in connection with step 208 is robust for cine images, as each adjacent image pair shows similar image content and contrast. Unfortunately, it is less suitable to register the DE-MRI image to the cine reference frame, as the DE-MRI image often presents a strongly enhanced infarction zone which bears no contrast in the cine series. As a result, the pixel-wise variational registration tends to generate unrealistic large deformation which degrades the image quality of warped DE-MRI images even with aggressive regularization.

Figure 3:
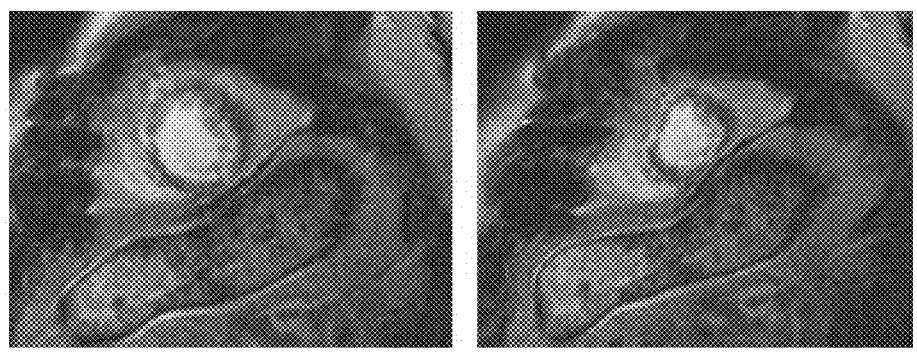
FIG. 3 illustrates registration of a DE-MRI image to a reference cine frame using variational registration.

FIG. 3 illustrates registration of a DE-MRI image to a reference cine frame using variational registration. As shown in FIG. 3, image (a) shows the DE-MRI image before registration and image (b) shows the warped DE-MRI image after registration. As shown in image (b), the warped DE-MRI image shows unrealistic deformation due to enhanced infarction bearing no contrast in the reference cine frame.

According to an advantageous embodiment of the present invention, in order to cope with inconsistent visibility between the DE-MRI and cine images and produce robust registration, a hybrid registration algorithm, which unifies intensity-based and point-based similarity into one cost function, may be used for registering the DE-MRI image to the reference cine frame. This cost function contains two terms: a feature point matching term and an intensity matching term. The point matching term is robust against contrast changes and occlusions between DE-MRI and the reference cine. The intensity term enforces the alignment of the myocardium with normal contrast uptake, playing a role of global regularization. The underlying deformation can be modeled as a Free-from deformation (FFD), which is a piece-wise cubic polynomial. Compared to pixel-wise variational registration, FFD is more robust against image content changes.

FFD can be manipulated by a regular control grid with spacing $s_x \times s_y$ for a 2D image. FFD is computationally efficient, because the deformation at any point is only influenced by that point's surrounding 4×4 control points. For a point p with coordinates (x, y), it is assumed that its 4×4 control points are $p_{i,j}$, i, j=0, . . . , 3. $d_{i,j}$ denotes the displacement vector associated with the control point $p_{i,j}$ and the interpolation at point p is defined as:

$$T(p \mid d_{ij}) = \sum_{i=0}^{3} \sum_{j=0}^{3} B_i(u) B_j(v) d_{ij}, \quad (2)$$

where $u = x/s_x - \lfloor x/s_x \rfloor$, $v = y/s_y - \lfloor y/s_y \rfloor$, and $B_i$ is the i-th basis function of B-splines.

Given reference image $R(p_i)$, i=1, . . . , N (e.g., the reference cine frame) and its feature point set $\{s_j\}_{j=1}^{M}$, and floating image $F(p_i)$ (e.g., the DE-MRI image) and its feature point set $\{t_j\}_{j=1}^{M}$, the images can be registered by solving the following minimization problem:

$$\hat{D} = \underset{D}{\operatorname{argmin}} \left\{ \frac{\lambda}{M} \sum_{M} \|T(s_j \mid D) - t_j\|^2 + \right. \quad (3)$$

$$\left. \frac{\sum_{N} (R(p_i) - \bar{R}) - (F(T(p_i \mid D)) - \bar{F})}{\sqrt{\sum_{N} (R(p_i) - \bar{R})^2 \sum_{N} (F(T(p_i \mid D)) - \bar{F})^2}} \right\}$$

where the first term of the cost function to be minimized is the point matching term and the second term is the intensity matching term. R is the reference image (reference cine frame) and F is the floating image (DE-MRI image). $\bar{R}$ and $\bar{F}$ are the mean intensity of the R and F, respectively. D is the unknown deformation parameter set $\{d_{ij}\}$. $\lambda$ is a parameter that is used to balance the influence of the two terms of the cost function. The value of $\lambda$ depends on the metric used in the intensity term. In a possible implement, Cross-Correlation (CC) can be used as the intensity metric and $\lambda$ can be set to −0.5. Equation (2) can be solved by limited memory Broyden-Fletcher-Goldfarb-Shanno (L-BFGS) optimization, which is more efficient than simple gradient descent for high dimensional optimization problems. L-BFGS optimization is well known to those skilled in the art.

Figure 4:
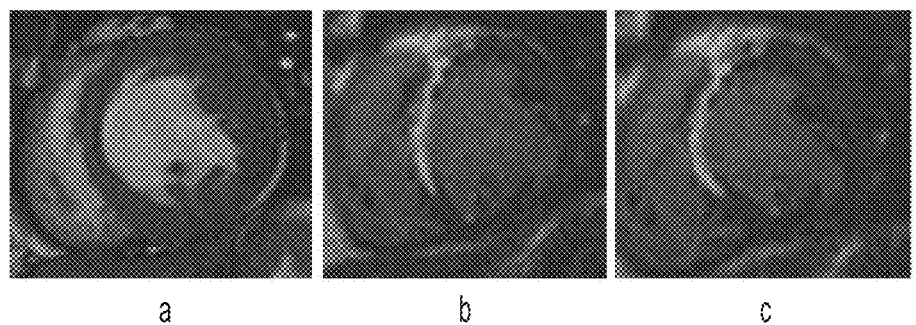
FIG. 4 illustrates exemplary results of registering DE-MRI image to a reference cine frame using a hybrid registration method.
Figure 4:
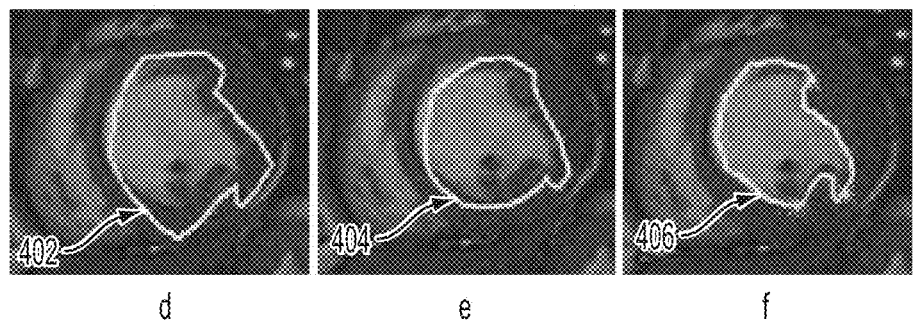

FIG. 4 illustrates exemplary results of registering DE-MRI image to a reference cine frame using the hybrid registration method. As illustrated in FIG. 4, image (a) is the reference cine images, image (b) is the original DE-MRI image, and image (c) is the aligned DE-MRI, which was registered to the reference cine image using the hybrid method described above (Cross-Correlation with Point Distance (CCPD)). In images (d), (e), and (f), a contour of the myocardium is delineated to show a comparison of the hybrid CCPD registration and non-hybrid intensity based registration (Cross-Correlation (CC)). In particular, image (d) shows the DE-MRI image with the delineated myocardium contour 402 before registration, image (e) shows the aligned DE-MRI image with the delineated myocardium contour 404 resulting from CC registration, and image (f) shows the aligned DE-MRI image with the delineated myocardium contour 406 resulting from the hybrid CCPD registration.

Returning to FIG. 2, at step 212, infarction information from the DE-MRI image is propagated over all cardiac phases in the cine sequence. The information from the DE-MRI image is propagated based on the deformation field resulting from the registration of the DE-MRI to the reference cine frame and the deformation fields generated within the cine sequence to register each frame to the reference frame. Referring again to FIG. 1, once all deformation fields $d_l$, l=1 . . . n are calculated, the DE-MRI image E can be propagated to yield all n cardiac phases: $E^*_l$, l=1 . . . n. In order to propagate the DE-MRI image, the DE-MRI image E is first deformed to $E^*_k$ using $E^*_k = E(d_k(p_i))$. Then, $E^*_k$ is propagated to the remaining n−1 phases using $E^*_l = E^*_k(d_l(p_i))$, l=1 . . . n, l≠k. This propagation of the DE-MRI image requires the inverse deformation fields pointing from the reference cine frame to the other n−1 phases. This inverse deformation fields are provided by the inverse consistent registration of the cine frames to the reference cine frame as described in step 208.

Figure 5:
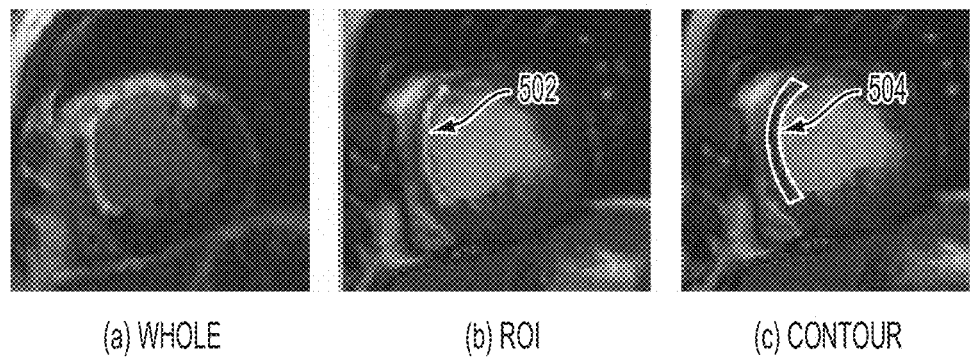
FIG. 5 illustrates the three possible propagation schemes.

According to an embodiment of the present invention, in order to better present propagated infarction information from the DE-MRI image, three propagation schemes can be implemented: whole DE-MRI image propagation, infarction contour propagation, and region-of-interest (ROI) propagation. FIG. 5 illustrates the three possible propagation schemes. As illustrated in FIG. 5, image (a) shows a whole DE-MRI image, image (b) shows a ROI 502 defined by superimposing an infarction region of a DE-MRI image on a cine image, and image (c) shows a delineated infarction contour 504 in a DE-MRI image. Whole DE-MRI image approximation resamples the whole DE-MRI image to the phases of the frames of the cine sequence, as described above and shown in FIG. 1. Contour propagation only deforms the scar (infarction) boundary in the DE-MRI image over all of the cardiac phases. The contour propagation is performed similarly to the whole DE-MRI image propagation, but using only the pixels on the delineated infarction contour in the DE-MRI image. The ROI propagation scheme transforms the infarction region in the DE-MRI image and superimposes the infarction region directly on the cine images. In this case, an ROI is first superimposed on the reference cine frame using the deformation field resulting from the registration of the DE-MRI image to the reference cine frame. The ROI is then superimposed on the remaining cine frames using the inverse deformation fields of the inverse consistent deformation fields generated within the cine sequence. It is to be understood that any of the three propagation schemes, separately or together, can be used to implement step 212 of FIG. 2.

Returning to FIG. 2, at step 214 the propagation results are output. For example, the propagation results can be output by displaying the propagation results (e.g., propagated DE-MRI image, propagated infarction contour, and/or cine frames with superimposed infarction ROI) on a display device of a computer system. The propagation results can also be output by storing the propagation results or a memory or storage of a computer system. The propagation results can then be further processed, for example to provide quantitative regional motion analysis for the infarction region.

Figure 6:
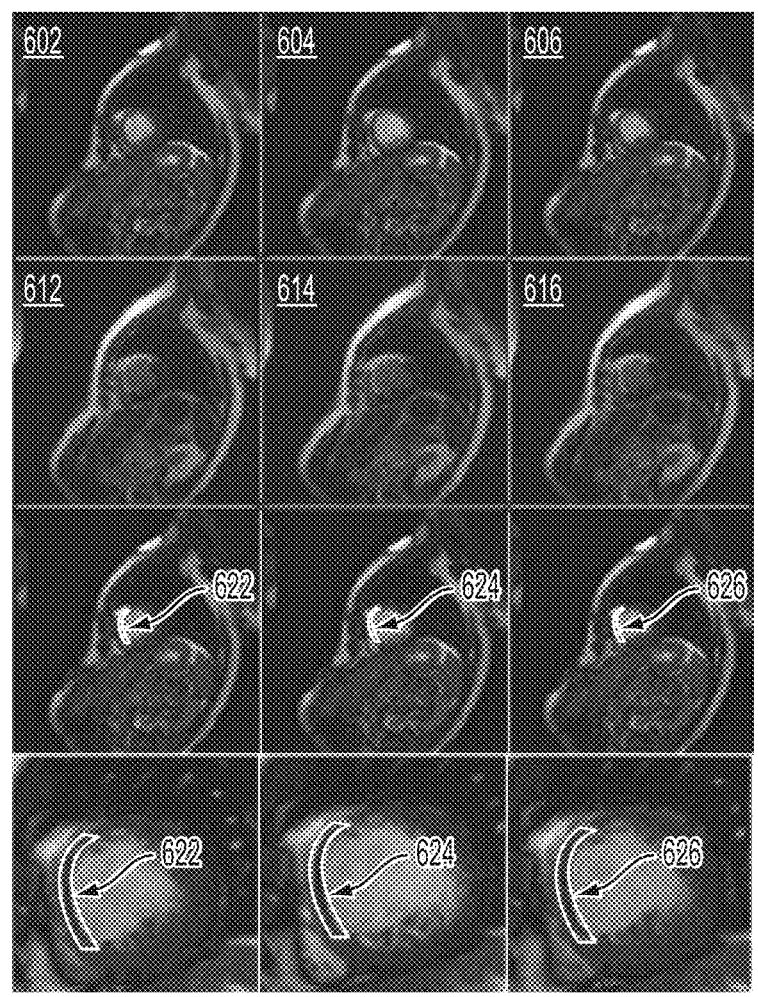
FIG. 6 illustrates exemplary propagation results using the method of FIG. 2.

FIG. 6 illustrates exemplary propagation results using the method of FIG. 2. As illustrated in FIG. 6, the first row of images shows cine images 602, 604, and 606 of a cine MRI sequence. Image 604 is the reference cine frame ($c_k$). The second row shows propagated DE-MRI images 612, 614, and 616 propagated to the phases of cine frames 602, 604, and 606, respectively. Accordingly, image 614 is the deformed DE-MRI image ($E^*_k$) to be registered to the reference cine frame ($c_k$) 604. The third row shows propagated infarction contours 622, 624, and 626 propagated to the phases of cine frames 602, 604, and 606, respectively, and the fourth row shows a zoomed in view of the propagated infarction contours 622, 624, and 626.

Figure 7:
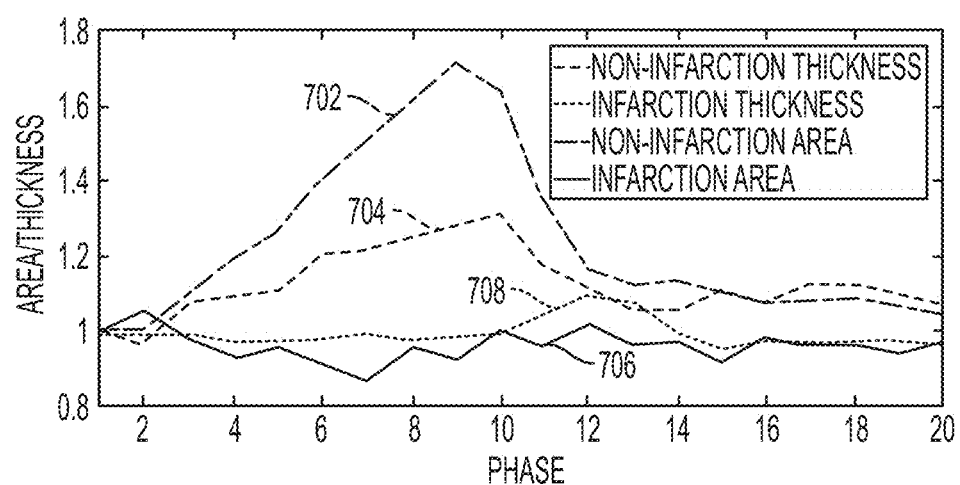
FIG. 7 illustrates the area and thickness of an infarction region and a healthy myocardium over one cardiac cycle.

Once the infarction information is propagated using the method of FIG. 2, the propagation results can be used for quantitative regional motion analysis for the infarction region. Suspicious infarction can degrade myocardial contraction. To highlight the potential of the above described method for abnormal motion pattern detection, the present inventors conducted experiments in which the scar (infarction) region is delineated in the DE-MRI image and the myocardial segment containing the scar labeled. Both the contour and segment are propagated to all cardiac phases using the estimated forward/inverse deformation fields. At each phase p, the area of the infarction zone $A_p$ is computed by counting the number of the internal pixels in the infarction region. The thickness $T_p$ of the infarction zone is computed by calculating the epi/endo distance of the segment. To alleviate inter-subject variability, $A_p$ and $T_p$ are normalized with respect to phase 0, i.e., $A_p = A_p/A_0$, $T_p = T_p/T_0$. For comparison, the normal myocardium is also delineated, of which the area and thickness are also computed. FIG. 7 illustrates the area and thickness of the infarction region and the healthy myocardium over one cardiac cycle for one test case. As shown in FIG. 7, the area 702 and thickness 704 of healthy (non-infarction) myocardium is found to change more significantly over cardiac phases of the cardiac cycle as compared to the area 706 and thickness of the infarction zone.

To quantify the change potentially caused by the suspicious infarction, $(A_p-A_0)/A_0$ is used to represent the relative area change and $(T_p-T_0)/T_0$, basically the segment strain ratio, is used to represent the relative thickness change. The mean and variance of 6 cases are listed in Table 2.

TABLE 2

| | Area/Thickness change %. | | | | | |
|---|---|---|---|---|---|---|
| | Cases | | | | | |
| | 1 | 2 | 3 | 4 | 5 | 6 |
| ACI | 4.5 ± 0.1 | 4.5 ± 0.2 | 8.4 ± 0.4 | 9.7 ± 1.1 | 3.1 ± 0.1 | 6.3 ± 0.2 |
| ACN | 13.1 ± 0.7 | 4.6 ± 0.2 | 6.7 ± 0.3 | 2.5 ± 0.0 | 10.6 ± 1.1 | 8.0 ± 0.2 |
| TCI | 2.7 ± 0.1 | 3.8 ± 0.1 | 5.9 ± 0.3 | 7.2 ± 0.3 | 3.7 ± 0.1 | 5.3 ± 0.2 |
| TCN | 23.5 ± 5.1 | 19.9 ± 4.9 | 15.5 ± 2.6 | 7.6 ± 0.7 | 20.0 ± 3.1 | 14.6 ± 1.1 |

ACI: Area Change of Infarction zone.
ACN: Area Change of Normal myocardium.
TCI: Thickness Change of Infarction zone.
TCN: Thickness Change of Normal myocardium.

Cases 1 and 5 show a noticeable decrease of both area and thickness changes for the infarction, while thickness dropped more in cases 2, 3 and 6. Interestingly, case 4 shows the contrary that relative area change increases for the infarction, although the registration and propagation performed well, which was verified by visual reading. These experiments reveal the feasibility of joint DE-MRI and cine assessment.

Figure 8:
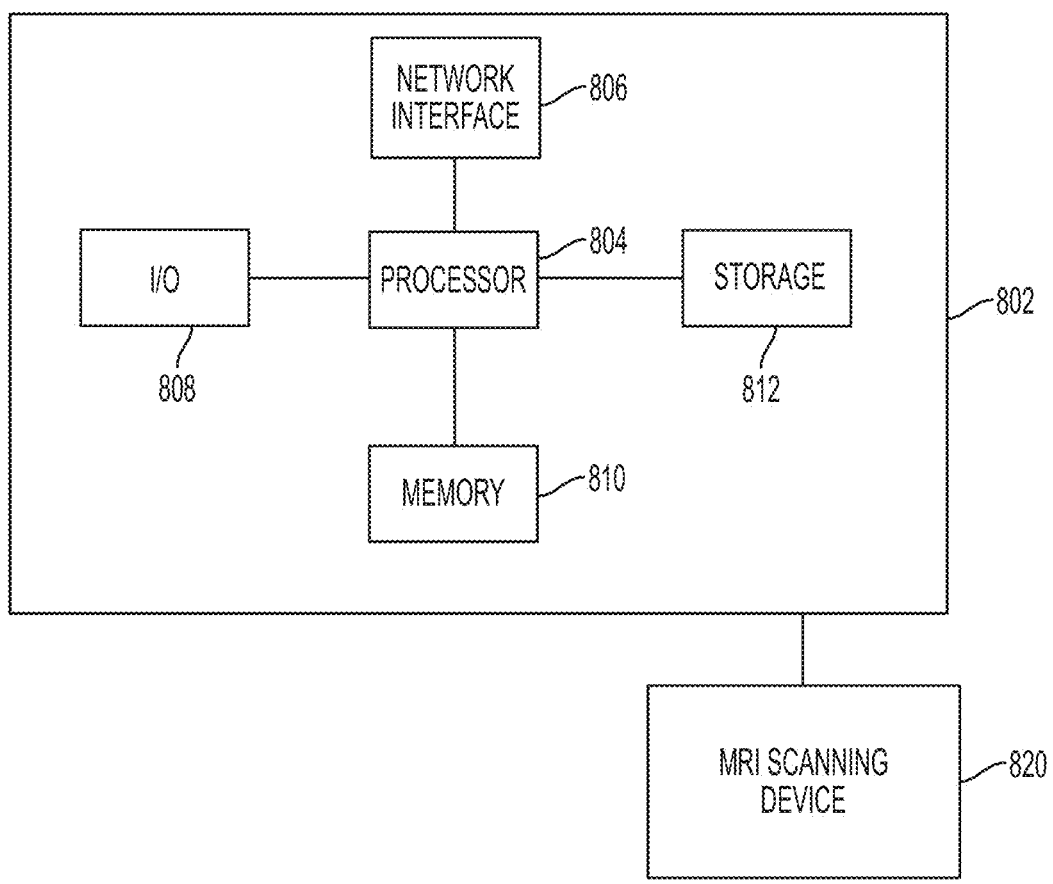
FIG. 8 is a high level block diagram of a computer capable of implementing the present invention.

The above-described methods for propagation of infarction information from a DE-MRI image based on a cine MRI sequence may be implemented on a computer using well-known computer processors, memory units, storage devices, computer software, and other components. A high level block diagram of such a computer is illustrated in FIG. 8. Computer 802 contains a processor 804 which controls the overall operation of the computer 802 by executing computer program instructions which define such operation. The computer program instructions may be stored in a storage device 812, or other computer readable medium (e.g., magnetic disk, CD ROM, etc.) and loaded into memory 810 when execution of the computer program instructions is desired. Thus, the steps of the method of FIG. 2 may be defined by the computer program instructions stored in the memory 810 and/or storage 812 and controlled by the processor 804 executing the computer program instructions. An MR scanning device 820 can be connected to the computer 802 to input MRI images to the computer 802. It is possible to implement the MR scanning device 820 and the computer 802 as one device. It is also possible that the MR scanning device 820 and the computer 802 communicate wirelessly through a network. The computer 802 also includes one or more network interfaces 806 for communicating with other devices via a network. The computer 802 also includes other input/output devices 808 that enable user interaction with the computer 802 (e.g., display, keyboard, mouse, speakers, buttons, etc.). One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for propagating at least a portion of a static image over a cardiac cycle, comprising:
   selecting a reference frame of a cine image sequence comprising a plurality of frames;
   calculating a plurality of deformation fields within the cine image sequence to register the frames of the cine image sequence to the reference frame;
   registering the static image to the reference frame of the cine image sequence; and
   propagating at least a portion of the static image to a plurality of cardiac phases corresponding to the plurality of frames in the cine image sequence based on a deformation field resulting from registering the static image to the reference frame and the plurality of deformation fields calculated within the cine image sequence.

2. The method of claim 1, wherein the step of selecting a reference frame of a cine image sequence comprises:
   selecting one of the plurality of frames in the cine image sequence that is most similar to the static image.

3. The method of claim 2, wherein the step of selecting one of the plurality of frames in the cine image sequence that is most similar to the static image comprises:
   selecting one of the plurality of frames in the cine image sequence corresponding to a cardiac phase closest to a cardiac phase of the static image based on trigger times associated with the frames of the cine image sequence.

4. The method of claim 2, wherein the step of selecting one of the plurality of frames in the cine image sequence that is most similar to the static image comprises:
   calculating a cross-correlation value between each frame of the cine image sequence and the static image; and
   selecting the frame with the largest cross-correlation value as the reference frame.

5. The method of claim 1, wherein the step of calculating a plurality of deformation fields within the cine image sequence to register the frames of the cine image sequence to the reference frame comprises:
   registering each frame of the cine image sequence other than the reference frame to the reference frame using variational non-rigid registration with an inverse consistent constraint.

6. The method of claim 1, wherein the step of calculating a plurality of deformation fields within the cine image sequence to register the frames of the cine image sequence to the reference frame comprises:
   calculating a plurality of inverse consistent deformation fields to register the frames of the cine image sequence other than the reference frame to the reference frame.

7. The method of claim 1, wherein the step of registering the static image to the reference frame of the cine image sequence comprises:
   registering the static image to the reference frame using a hybrid registration algorithm that unifies intensity-based and point-based similarity into a single cost function.

8. The method of claim 7, wherein the cost function includes a feature point matching term and an intensity matching term.

9. The method of claim 1, wherein the step of propagating at least a portion of the static image to a plurality of cardiac phases corresponding to the plurality of frames in the cine image sequence comprises:
   propagating the portion of the static image to a phase of the reference frame using the deformation field resulting from registering the static image to the reference frame; and
   propagating the portion of the static image from the phase of the reference frame to a phase associated with each frame of the cine image sequence other than the reference frame using an inverse of a respective one of the plurality of deformation fields calculated within the cine image sequence.

10. The method of claim 1, wherein the step of propagating at least a portion of the static image to a plurality of cardiac phases corresponding to the plurality of frames in the cine image sequence comprises:
    deforming the static image using the deformation field resulting from registering the static image to the reference frame; and
    propagating the deformed static image to a phase associated with each frame of the cine image sequence other than the reference frame using an inverse of a respective one of the plurality of deformation fields calculated within the cine image sequence.

11. The method of claim 1, wherein the step of propagating at least a portion of the static image to a plurality of cardiac phases corresponding to the plurality of frames in the cine image sequence comprises:
    deforming a delineated contour corresponding to a region of interest in the static image using the deformation field resulting from registering the static image to the reference frame; and
    propagating the deformed contour to a phase associated with each frame of the cine image sequence other than the reference frame using an inverse of a respective one of the plurality of deformation fields calculated within the cine image sequence.

12. The method of claim 1, wherein the step of propagating at least a portion of the static image to a plurality of cardiac phases corresponding to the plurality of frames in the cine image sequence comprises:
    generating a region-of-interest in the reference frame by superimposing the portion of the static image onto the reference frame using the deformation field resulting from registering the static image to the reference frame; and
    propagating the region-of-interest from the reference frame to each frame of the cine image sequence other than the reference frame using an inverse of a respective one of the plurality of deformation fields calculated within the cine image sequence.

13. An apparatus for propagating at least a portion of static image over a cardiac cycle, comprising:
    means for selecting a reference frame of a cine image sequence comprising a plurality of frames;
    means for calculating a plurality of deformation fields within the cine image sequence to register the frames of the cine image sequence to the reference frame;
    means for registering a static image to the reference frame of the cine image sequence; and
    means for propagating at least a portion of the static image to a plurality of cardiac phases corresponding to the plurality of frames in the cine image sequence based on a deformation field resulting from registering the static image to the reference frame and the plurality of deformation fields calculated within the cine image sequence.

14. The apparatus of claim 13, wherein the means for selecting a reference frame of a cine image sequence comprises:
   means for selecting one of the plurality of frames in the cine image sequence that is most similar to the static image.

15. The apparatus of claim 13, wherein the means for calculating a plurality of deformation fields within the cine image sequence to register the frames of the cine image sequence to the reference frame comprises:
   means for registering each frame of the cine image sequence other than the reference frame to the reference frame using variational non-rigid registration with an inverse consistent constraint.

16. The apparatus of claim 13, wherein the means for calculating a plurality of deformation fields within the cine image sequence to register the frames of the cine image sequence to the reference frame comprises:
   means for calculating a plurality of inverse consistent deformation fields to register the frames of the cine image sequence other than the reference frame to the reference frame.

17. The apparatus of claim 13, wherein the means for registering a static image to the reference frame of the cine image sequence comprises:
   means for registering the static image to the reference frame using a hybrid registration algorithm that unifies intensity-based and point-based similarity into a single cost function.

18. The apparatus of claim 17, wherein the cost function includes a feature point matching term and an intensity matching term.

19. The apparatus of claim 13, wherein the means for propagating at least a portion of the static image to a plurality of cardiac phases corresponding to the plurality of frames in the cine image sequence comprises:
   means for propagating the portion of the static image to a phase of the reference frame using the deformation field resulting from registering the static image to the reference frame; and
   means for propagating the portion of the static image from the phase of the reference frame to a phase associated with each frame of the cine image sequence other than the reference frame using an inverse of a respective one of the plurality of deformation fields calculated within the cine image sequence.

20. The apparatus of claim 13, wherein the means for propagating at least a portion of the static image to a plurality of cardiac phases corresponding to the plurality of frames in the cine image sequence comprises:
   means for deforming the static image using the deformation field resulting from registering the static image to the reference frame; and
   means for propagating the deformed static image to a phase associated with each frame of the cine image sequence other than the reference frame using an inverse of a respective one of the plurality of deformation fields calculated within the cine image sequence.

21. The apparatus of claim 13, wherein the means for propagating at least a portion of the static image to a plurality of cardiac phases corresponding to the plurality of frames in the cine image sequence comprises:
   means for deforming a delineated contour corresponding to a region of interest in the static image using the deformation field resulting from registering the static image to the reference frame; and
   means for propagating the deformed contour to a phase associated with each frame of the cine image sequence other than the reference frame using an inverse of a respective one of the plurality of deformation fields calculated within the cine image sequence.

22. The apparatus of claim 13, wherein the means for propagating at least a portion of the static image to a plurality of cardiac phases corresponding to the plurality of frames in the cine image sequence comprises:
   means for generating a region-of-interest in the reference frame by superimposing the portion of the static image onto the reference frame using the deformation field resulting from registering the static image to the reference frame; and
   means for propagating the region-of-interest from the reference frame to each frame of the cine image sequence other than the reference frame using an inverse of a respective one of the plurality of deformation fields calculated within the cine image sequence.

23. A non-transitory computer readable medium encoded with computer executable instructions for propagating at least a portion of a static image over a cardiac cycle, the computer executable instructions defining steps comprising:
   selecting a reference frame of a cine image sequence comprising a plurality of frames;
   calculating a plurality of deformation fields within the cine image sequence to register the frames of the cine image sequence to the reference frame;
   registering a static image to the reference frame of the cine image sequence; and
   propagating at least a portion of the static image to a plurality of cardiac phases corresponding to the plurality of frames in the cine image sequence based on a deformation field resulting from registering the static image to the reference frame and the plurality of deformation fields calculated within the cine image sequence.

24. The non-transitory computer readable medium of claim 23, wherein the computer executable instructions defining the step of selecting a reference frame of a cine image sequence comprise computer executable instructions defining the step of:
   selecting one of the plurality of frames in the cine image sequence that is most similar to the static image.

25. The non-transitory computer readable medium of claim 23, wherein the computer executable instructions defining the step of calculating a plurality of deformation fields within the cine image sequence to register the frames of the cine image sequence to the reference frame comprise computer executable instructions defining the step of:
   registering each frame of the cine image sequence other than the reference frame to the reference frame using variational non-rigid registration with an inverse consistent constraint.

26. The non-transitory computer readable medium of claim 23, wherein the computer executable instructions defining the step of calculating a plurality of deformation fields within the cine image sequence to register the frames of the cine image sequence to the reference frame comprise computer executable instructions defining the step of:
   calculating a plurality of inverse consistent deformation fields to register the frames of the cine image sequence other than the reference frame to the reference frame.

27. The non-transitory computer readable medium of claim 23, wherein the computer executable instructions defining the step of registering a static image to the reference frame of the cine MRI sequence comprise computer executable instructions defining the step of:

registering the static image to the reference frame using a hybrid registration algorithm that unifies intensity-based and point-based similarity into a single cost function.

28. The non-transitory computer readable medium of claim 27, wherein the cost function includes a feature point matching term and an intensity matching term.

29. The non-transitory computer readable medium of claim 23, wherein the computer executable instructions defining the step of propagating at least a portion of the static image to a plurality of cardiac phases corresponding to the plurality of frames in the cine image sequence comprise computer executable instructions defining the steps of:

propagating the portion of the static image to a phase of the reference frame using the deformation field resulting from registering the static image to the reference frame; and propagating the portion of the static image from the phase of the reference frame to a phase associated with each frame of the cine image sequence other than the reference frame using an inverse of a respective one of the plurality of deformation fields calculated within the cine image sequence.

30. The non-transitory computer readable medium of claim 23, wherein the computer executable instructions defining the step of propagating at least a portion of the static image to a plurality of cardiac phases corresponding to the plurality of frames in the cine image sequence comprise computer executable instructions defining the steps of:

deforming the static image using the deformation field resulting from registering the static image to the reference frame; and propagating the deformed static image to a phase associated with each frame of the cine image sequence other than the reference frame using an inverse of a respective one of the plurality of deformation fields calculated within the cine image sequence.

31. The non-transitory computer readable medium of claim 23, wherein the computer executable instructions defining the step of propagating at least a portion of the static image to a plurality of cardiac phases corresponding to the plurality of frames in the cine image sequence comprise computer executable instructions defining the steps of:

deforming a delineated contour corresponding to a region of interest in the static image using the deformation field resulting from registering the static image to the reference frame; and propagating the deformed contour to a phase associated with each frame of the cine image sequence other than the reference frame using an inverse of a respective one of the plurality of deformation fields calculated within the cine image sequence.

32. The non-transitory computer readable medium of claim 23, wherein the computer executable instructions defining the step of propagating at least a portion of the static image to a plurality of cardiac phases corresponding to the plurality of frames in the cine image sequence comprise computer executable instructions defining the steps of:

generating a region-of-interest in the reference frame by superimposing the portion of the static image onto the reference frame using the deformation field resulting from registering the static image to the reference frame; and propagating the region-of-interest from the reference frame to each frame of the cine image sequence other than the reference frame using an inverse of a respective one of the plurality of deformation fields calculated within the cine image sequence.

* * * * *